United States Patent [19]

Matsuzaki et al.

[11] Patent Number: 5,296,855
[45] Date of Patent: Mar. 22, 1994

[54] OFFSET CORRECTION APPARATUS OF TURNING ANGULAR VELOCITY SENSOR

[75] Inventors: Shinichi Matsuzaki; Kenji Okamoto, both of Osaka, Japan

[73] Assignee: Sumitomo Electric Industries, Ltd., Osaka, Japan

[21] Appl. No.: 794,941

[22] Filed: Nov. 20, 1991

[30] Foreign Application Priority Data

Nov. 30, 1990 [JP] Japan .................................. 2-340021

[51] Int. Cl.⁵ ............................................ G08G 1/123
[52] U.S. Cl. ...................................... 340/988; 340/995
[58] Field of Search ....................... 340/988, 990, 995; 364/443

[56] References Cited

U.S. PATENT DOCUMENTS 4,890,233 12/1989 Ando .................................. 340/995

Primary Examiner—Hezron E. Williams
Assistant Examiner—Christine K. Oda
Attorney, Agent, or Firm—Lane, Aitken & McCann

[57] ABSTRACT

An offset correction apparatus comprising a turning angular velocity sensor, a vehicle speed sensor for outputting a pulsed signal every constant distance traveled by a vehicle, a stop determining unit for determining that the vehicle is at a stop, an offset calculation unit for integrating an output of the turning angular velocity sensor during a period of time that the stop of the vehicle is determined by the stop determining unit and then calculating an offset value of the output of the turning angular velocity sensor, a storage unit to store the offset value calculated by the offset calculation unit, and a heading correction unit for correcting heading data obtained from the output of the turning angular velocity sensor, with the offset value, wherein when the pulsed signal from the vehicle speed sensor disappears and the output from the turning angular velocity sensor is less than a threshold, the stop determining unit determines that the vehicle is at a stop.

2 Claims, 4 Drawing Sheets

OFFSET CORRECTION APPARATUS OF TURNING ANGULAR VELOCITY SENSOR

FIELD OF THE INVENTION

The present invention relates to an offset correction apparatus which corrects the offset value of angular velocity data that is obtained by a turning angular velocity sensor, such as optical fiber gyros, mechanical type gyros, vibration gyros, and gas rate gyros.

DESCRIPTION OF THE PRIOR ART

Vehicle navigational systems have been developed and used to provide information about the current location and heading of a vehicle which is obtained from the travel speed and heading data of the vehicle measured by wheel and heading sensors on the vehicle.

A sensor for sensing a difference between the rotations of the wheels of the vehicle has been widely used as the heading sensor, but a turning angular velocity sensor has been developed as a new technique. In a case where the heading of the vehicle is obtained by a vehicle navigational system using the turning angular velocity sensor, a current heading $\theta$ of the vehicle is calculated by the following equation (1):

$$\theta = \theta_o + \delta\theta \qquad (1)$$

where $\delta\theta$ is angular velocity data and $\theta_o$ is a heading obtained at the time of the preceding sampling.

On the basis of that heading data $\theta$ and the travel distance data $\delta l$ obtained from the wheel sensor, current vehicle's location data (Px, Py) can be obtained by adding the east-west directional component $\delta x$ ($=\delta l \times \cos \theta$) and south-north directional component $\delta y$ ($=\delta l \times \sin \theta$) of the travel distance data $\delta l$ to the previous vehicle's location data (Px', Py').

It is noted that, in fact, the output of the turning angular velocity sensor is an analog value, this value is converted into a digital value by an A/D converter and supplied to a computer, then an turning angle is obtained by reading the digital value out of the computer. It is also noted that, by comparing an absolute heading obtained with the aid of a terrestrial magnetism sensor with the heading data obtained from the output of the above mentioned turning angular velocity sensor, heading data of higher accuracy can be obtained.

The turning angular velocity sensor tends to generate an output (offset) due to the influence of temperature or humidity, even when the sensor output should be zero during the time the vehicle moves in a straight line. In addition, sometimes the offset value itself drifts due to the change of environment such as a rise in the surrounding temperature of the device.

That offset output is accumulated if it is repeatedly processed by the above mentioned equation (1), so a heading departing from the actual heading of the vehicle is sensed. It is therefore necessary to make an offset correction of the angular velocity sensor output.

In order to make the offset correction, there has been proposed an offset correction method in which offset data during the time a vehicle is at a stop are obtained by a distance sensor and in which the offset correction is made by subtracting an averaged offset value during that time from the output of the turning angular velocity sensor as the vehicle moves again.

In that method the offset value of the angular velocity output can be corrected based on the data during the time the vehicle is at a stop, so the heading of the vehicle after the offset correction will become accurate.

In the above mentioned method, it is important how the time that a vehicle is at a stop is determined.

That is, in a case where a vehicle speed sensor for outputting a pulsed signal every constant distance traveled by the vehicle (e.g., wheel sensor for sensing with pulses the number of rotations of the wheel of a vehicle) is used, the stop of the vehicle can be determined at the time the sensor output disappears and the movement of the vehicle can be determined at the time the sensor output appears. However, immediately before the vehicle stops and immediately after the vehicle moves, there occurs the period that the vehicle speed pulse is not outputted depending upon the resolution of the vehicle speed pulse, even when the vehicle is moving. It is expected that if the sensor outputs during that period are accessed, the offset correction becomes inaccurate. The reason is that a large sensor output appears immediately before the vehicle is stopped and immediately after the vehicle restarts, since normally the acceleration is large although it depends on the turning radius. For this reason, the output of the turning angular velocity sensor is not accessed for a certain period after the stop of the vehicle was determined and for a certain period (hereinafter referred as to a margin) before the movement of the vehicle is determined, but if the margin is too short, when the turning radius is small and a large turning angular sensor output appears, an error of offset correction occurs. Therefore, in order to obtain an accurate offset value independently of the size of the turning radius, a long margin is required. However, the number of data for calculating the offset value is reduced because of the long margin, so that there occurs the problem that as a matter of fact, the offset correction cannot be made if the stop of the vehicle is short.

Then, it is also considered that the stop of the vehicle is determined by only the turning angular velocity sensor output (in which the offset value is corrected) without using the vehicle speed sensor. That is, if the turning angular velocity sensor output is less than a threshold, then it is determined that the vehicle is at a stop, but the sensor output becomes smaller when the turning radius is large. Therefore, even if the sensor output becomes less than the threshold, sometimes the vehicle is still turning and does not stop completely. Therefore, it is necessary to make the margin longer but a large part of the margin comes to nothing, when the turning radius is small and a large output of the turning angular sensor appears.

It is, accordingly, an object of the present invention to provide an offset correction apparatus which is capable of correcting heading data or angular velocity data with an accurate offset value.

SUMMARY OF THE INVENTION

In accordance with one important aspect of the present invention, there is provided an offset correction apparatus comprising a turning angular velocity sensor, a vehicle speed sensor for outputting a pulsed signal every constant distance traveled by a vehicle, a stop determining unit for determining that the vehicle is at a stop, an offset calculation unit for integrating an output of the turning angular velocity sensor during a period of time that the stop of the vehicle is determined by the stop determining unit and then calculating an offset value of the output of the turning angular velocity sensor, a storage unit to store the offset value calculated by the offset calculation unit, and a heading correction unit for correcting heading data obtained from the output of the turning angular velocity sensor, with the offset value, wherein when the pulsed signal from the vehicle speed sensor disappears and the output from the turning angular velocity sensor is less than a threshold, the stop determining unit determines that the vehicle is at a stop.

The offset calculation means may evaluate an error in the output of the turning angular velocity sensor, and if the evaluated error becomes less than an error caused by a drift of the offset value, the offset calculation means may calculate the offset value of the output of the turning angular velocity sensor independently of the period of the stop of the vehicle determined by the stop determining means.

In the present invention, the period that the vehicle is at a stop is determined by the stop determining means on the basis of disappearance of the vehicle speed sensor output and a reduction in the turning angular velocity sensor output.

That is to say, it is expected that when the vehicle comes to a stop, if the turning radius is large, then the vehicle speed sensor output will disappear after the turning angular velocity sensor output became less than the threshold, and if the turning radius is small, then the turning angular velocity sensor output will becomes less than the threshold after the vehicle speed sensor output disappeared. Also, it is expected that when the vehicle starts moving, if the turning radius is large, then the vehicle speed sensor output will appear before the turning angular velocity sensor output exceeds the threshold, and if the turning radius is small, then the turning angular velocity sensor output will exceed the threshold before the vehicle speed sensor output appears.

These expectation will be explained in conjunction with FIG. 1. It is assumed that a vehicle decelerates or moves at uniform acceleration of a. If the turning radius of the vehicle is R, the threshold of the turning angular velocity sensor is $\theta g$ and the distance resolution of the vehicle speed sensor is d, the time (tw) it takes the vehicle to actually comes to a stop from the disappearance of the vehicle sensor output or the time it takes the first output of the vehicle speed sensor to appear from the actual movement of the vehicle will become:

$$tw = d/a$$

The time tw is independent on the turning radius R. In addition, the time (tg) it takes the vehicle to actually comes to a stop from the disappearance of the turning angular velocity sensor output or the time it takes the first output of the turning angular velocity sensor to appear from the actual movement of the vehicle will become:

$$tg = \theta g \, R/a$$

As will be seen from FIG. 1, when the turning radius R is small, by determining the stop of the vehicle late and the movement of the vehicle earlier with the aid of the turning angular velocity sensor output, the accuracy of the stop determination can be increased. That is, the period that the vehicle is at a stop is determined by minimizing the length of the margin on the basis of the region enclosed by tw and tg.

In addition, in the present invention, if the error in the output of the turning angular velocity sensor becomes less than an error caused by a drift of the offset value, the offset correction is made even during the period of the stop of the vehicle determined by the stop determining means. The reason is that once the error in the output of the turning angular velocity sensor becomes less than an error caused by a drift of the offset value, the accuracy of the offset value cannot be improved even if the output data of the turning angular velocity sensor are collected.

BRIEF DESCRIPTION OF THE DRAWINGS

The above and other objects and advantages will become apparent from the following detailed description when read in conjunction with the accompanying drawings wherein.

DESCRIPTION OF THE PREFERRED EMBODIMENT

Figure 1:
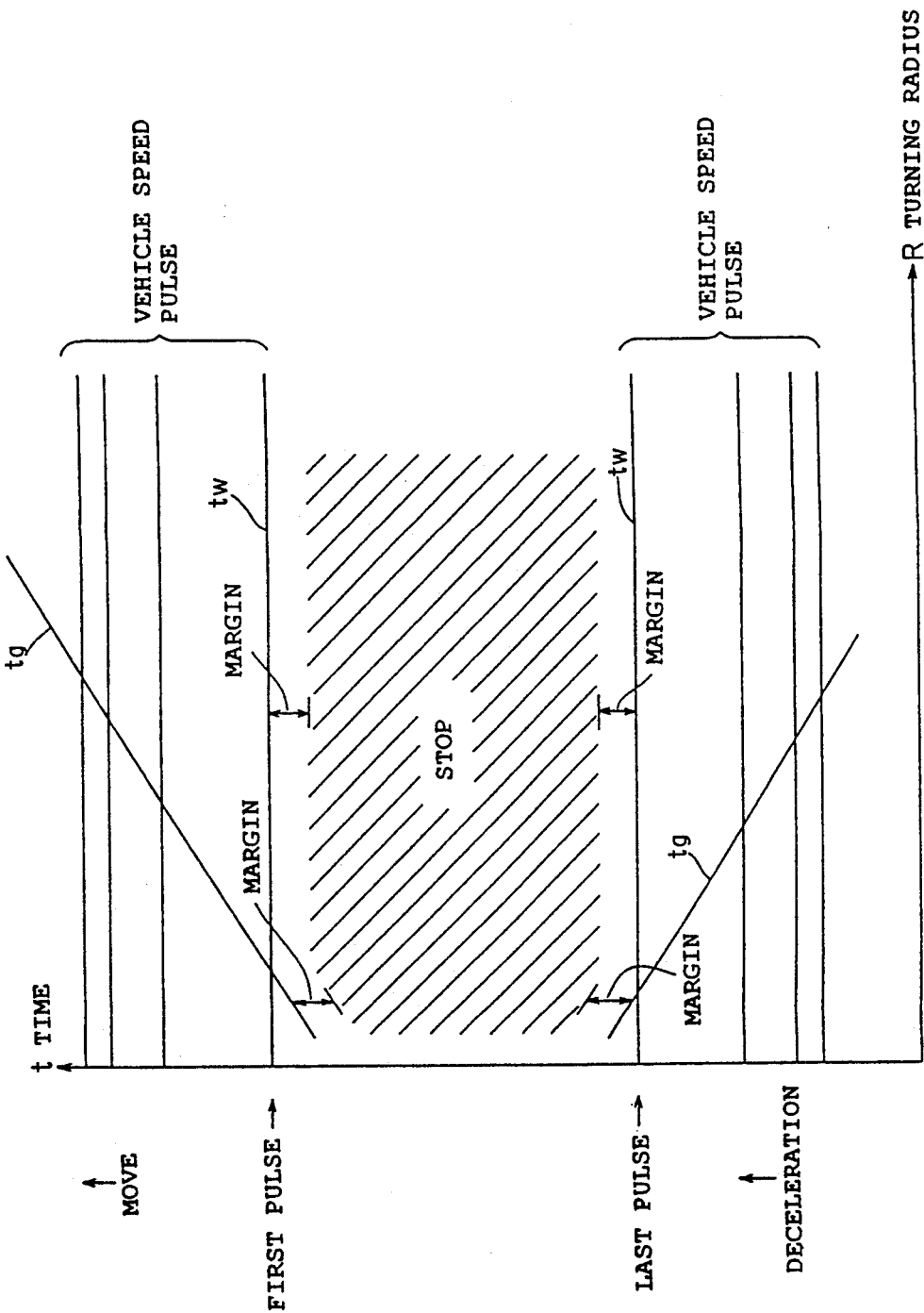
FIG. 1 is a diagram showing a period during which a vehicle is at a stop.
Figure 2:
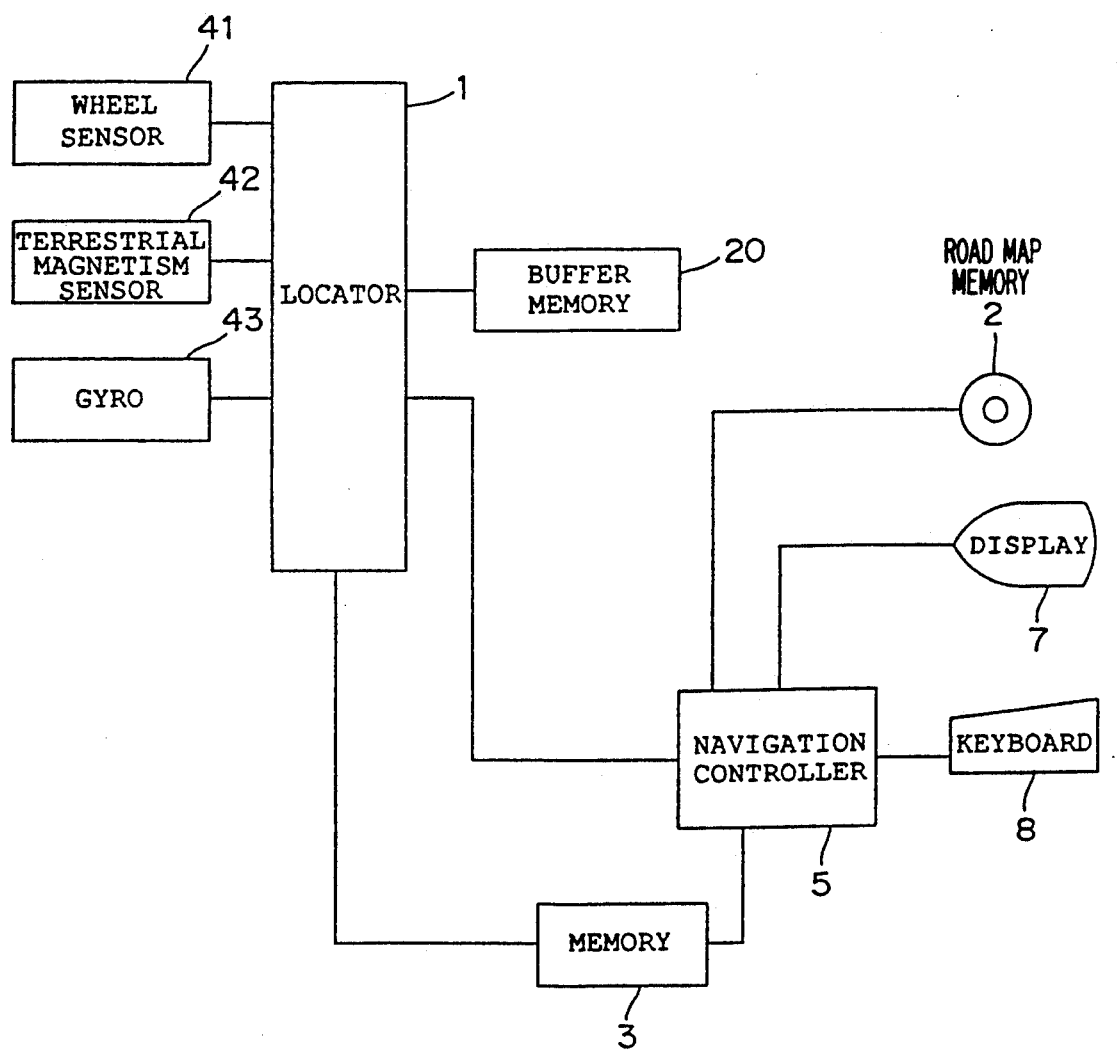
FIG. 2 is a block diagram of a vehicle navigational system into which an offset correction apparatus of the present invention is incorporated.

Referring to FIG. 2, there is shown a vehicle navigational system into which an offset correction apparatus of the present invention is incorporated. The vehicle navigational system here means an apparatus which reads heading data obtained from the output of a turning angular velocity sensor, calculates a current estimated heading of a vehicle from a value of the heading data and the previous estimated heading, and calculates a current location of the vehicle from the current estimated heading and data of distances traveled.

The vehicle navigational system comprises:

a wheel sensor 41 for sensing the number of rotations of the left and right wheels of a vehicle (this sensor is used as a vehicle speed sensor), a terrestrial magnetism sensor 42, a gyro 43 (which is used as a turning angular velocity sensor and selected from an optical fiber gyro for reading a turning angular velocity as a phase change in coherent light, a vibration gyro for sensing a turning angular velocity with the aid of a cantilever vibration technique of an piezoelectric element, a mechanical type gyro, or the like), a road map memory 2 having road map data stored therein, a locator 1 which calculates an estimated heading of a vehicle on the basis of the output data sensed by the gyro 43 and the terrestrial magnetism sensor 42, calculates a current location of the vehicle from the estimated heading and the data from the wheel sensor 41, and transmits the current vehicle location to a memory 3, a buffer memory 20 attached to the locator 1, and a navigation controller 5 which reads the current vehicle location out of the memory 3, displays it on a display 7, together with a road map, and interfaces with a keyboard 8.

The above mentioned locator 1, for example, obtains the number of rotations of the wheels by counting the number of pulses of the output pulsed signal from the wheel sensor 41 with the aid of a counter, and calculates data of travel distances per unit time by multiplying the count data outputted from the counter by a predetermined constant representative of a distance per one count, and obtains a relative change in the heading of the vehicle from the gyro 43 to calculate heading output data of the vehicle. In addition, the locator 1 obtains the output data of the gyro 43 during the time the vehicle is at a stop and, during the vehicle stop, averages the obtained output data every point of time, which will be described later, to obtain an offset value. The locator 1 corrects the above mentioned heading output data of the vehicle with the aid of the offset value, so it has a function of the offset correction apparatus of the present invention.

The buffer memory 20 is one which has stored therein the offset data of the gyro 43 during the time the vehicle is at a stop.

The above mentioned road map memory 2 comprises a mass storage medium memory such as a CD-ROM, IC memory card and magnetic tape, and has road map data of a predetermined range stored in advance therein.

The above mentioned display 7 is one which displays road map during travel, a current vehicle location, and a heading of the vehicle with the aid of a CRT (Cathode Ray Tube), a crystalline panel, etc.

The above mentioned navigation controller 5 is constituted by a graphic processor, image processing memory and the like, and performs the retrieval, the switch of a reduced scale, and the scroll of a road map on the display 7.

Figure 3:
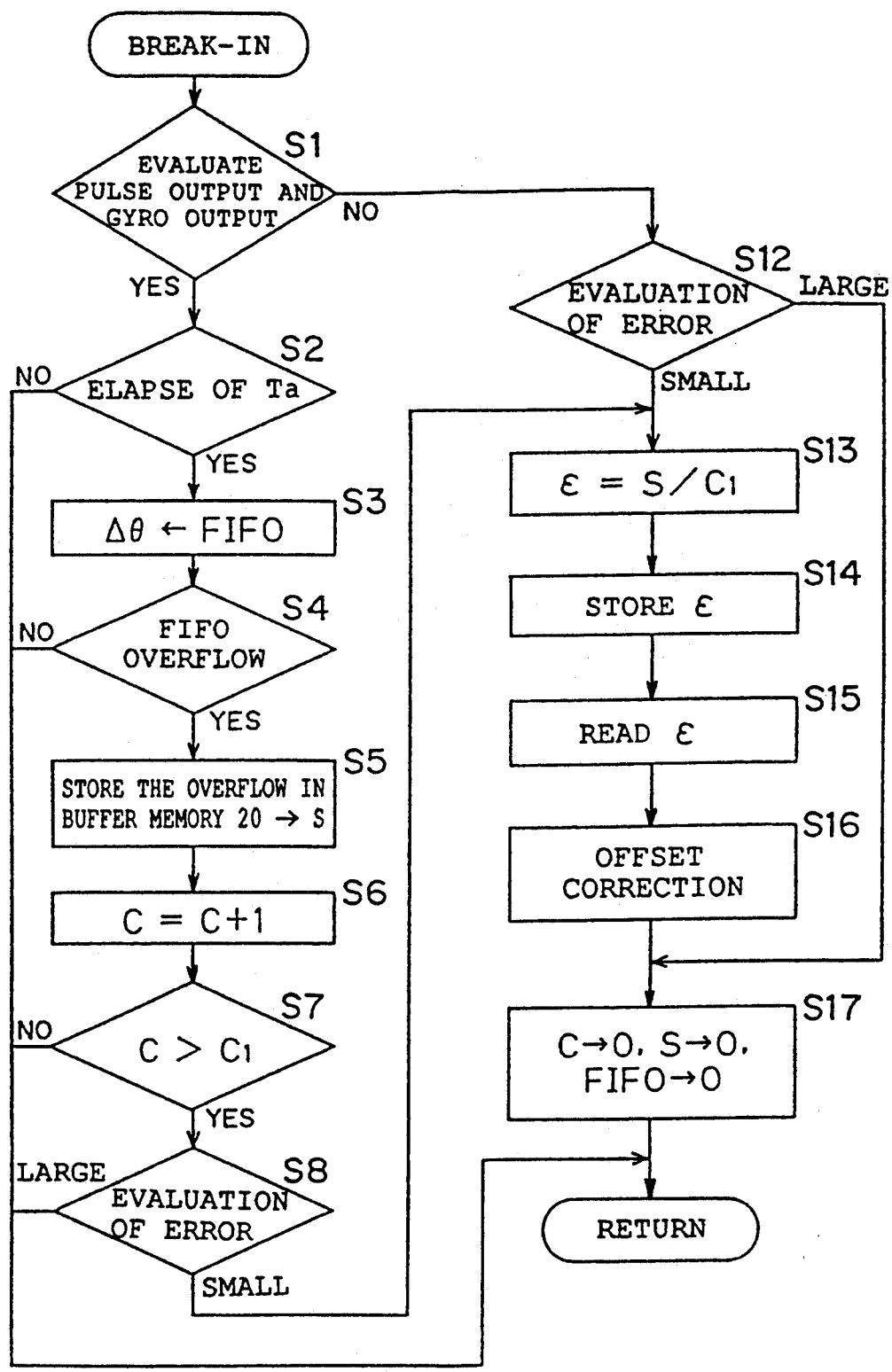
FIG. 3 is a flow chart illustrating how the offset correction is made.

The vehicle heading detecting processes by the vehicle navigational system as constructed above will hereinafter be explained. The vehicle navigational system, on the basis of the output data of each sensor, displays the position and heading of a vehicle on the display 7, together with the road map containing the position and heading of the vehicle. At the same time, the vehicle navigational system accesses the output data of the gyro 43 every certain time of sampling and updates the position and heading of the vehicle at all times. During this updating process of the position and heading, the correction of the heading of the vehicle breaks in as shown in FIG. 3. This break-in is made each time the output data of the gyro 43 is accessed.

Figure 4:
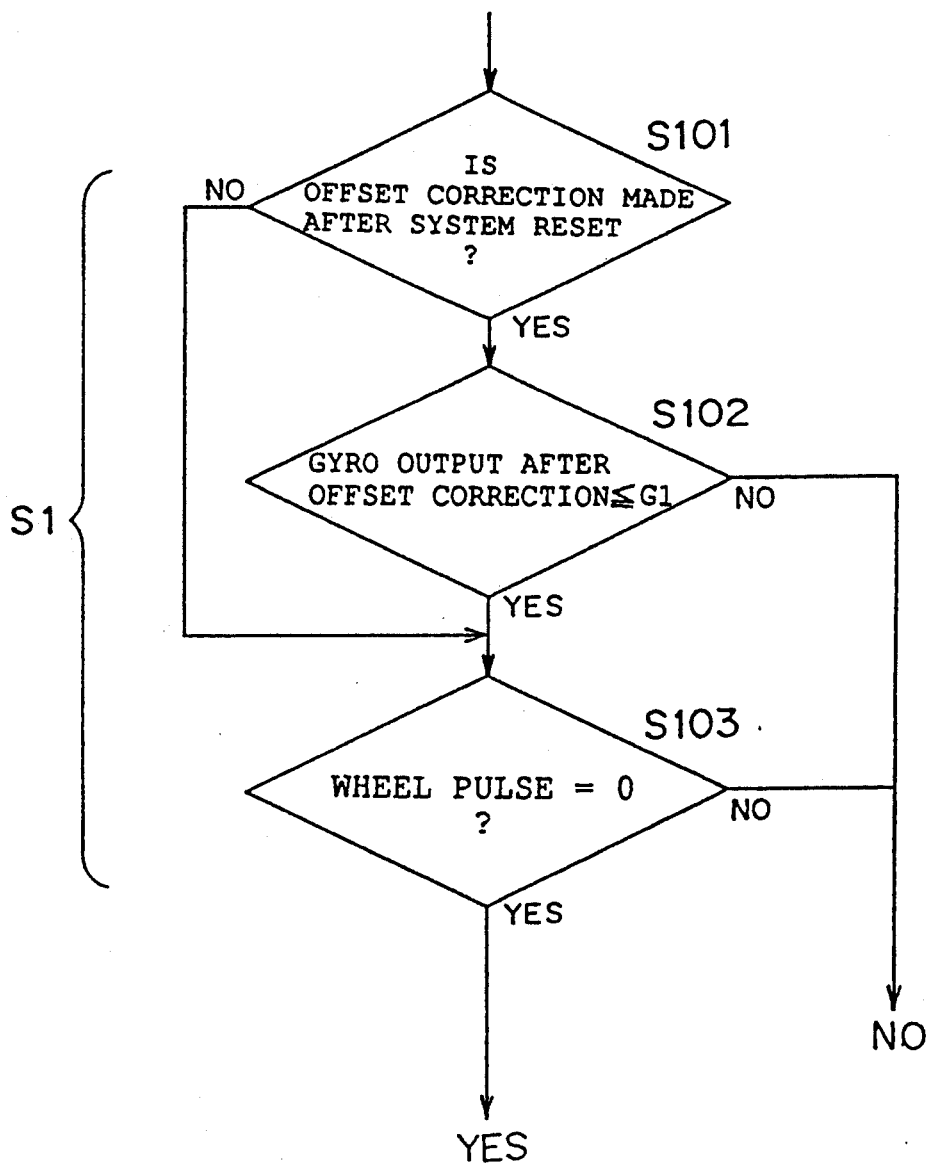
FIG. 4 is a flow chart illustrating how it is determined that the vehicle is at a stop.

In step S1, it is determined, from the pulse output of the wheel sensor 41 and the output of the gyro 43, if the vehicle is at a stop. That determination method is shown in FIG. 4. In the step 101 of FIG. 4, it is determined if an offset correction is made after the system is reset (for example, after the vehicle moves). If the offset correction is not made, then the step S101 advances directly to step S103. In step S102, it is determined if the gyro output is less than a threshold G1. If yes, then the step S102 advances to the step S103. In the step S103, it is determined if the pulse of the wheel sensor 41 is zero. If yes, then it is determined that there is the possibility that the vehicle is at a stop, and the step S103 advances to the step S2 of FIG. 3. If not, then it is determined that the vehicle is not at a stop and the step S103 advances to the step S12 of FIG. 3.

In the step S2, the step S2 awaits for an elapse of a certain time (margin) Ta immediately after the vehicle came to a stop. There is no utilization of the output data of the gyro 43 obtained until the margin Ta elapses. The reason is that, immediately before the vehicle stops completely, even if the output of the wheel sensor 41 is zero or the output of the gyro 43 is less than the threshold G1, sometimes the vehicle is still moving.

After the elapse of the margin Ta, the step S2 advances to step S3, in which the output data $\delta\theta$ of the gyro 43 are stored in the FIFO memory incorporated into the locator 1. This memory is constructed such that if it is filled up, the data first stored will overflow first. The capacity of the memory is selected so that (sampling time of the gyro 43)×(the number of storages)= (a certain margin Tb immediately before the vehicle starts). That margin Tb is equivalent to the time that the vehicle may move, although the output of the wheel sensor 41 is zero and the output of the gyro is less than the threshold G1.

In step S4, wait until the FIFO memory overflows. If the FIFO memory overflows, values that overflowed are accumulated in step S5 as a value S. That is, $$S = \sum_{Ta<T} \delta\theta$$

The step S5 advances to step S6, in which a count representative of the number of data obtained is added by one.

In the manner described above, after the vehicle comes to a stop and the margin Ta elapses, the data of the gyro 43 can be accumulated as the above mentioned value S. Therefore, the accumulated value S is given by integrating the offset value of the gyro 43 as the vehicle is in its stopped state, and represents an error in the heading of the vehicle. It is noted that although, in the FIFO memory, data during the margin Tb are still stored, these data are not used. The reason is that, since there is the possibility that the vehicle is moving slowly during the margin Tb, there is the possibility that data of distances actually traveled as well as the offset value are subtracted by mistake, if the heading is corrected with the data during margin Tb.

In step S7, it is determined if the number of data integrated has reached a certain number C1. The reason is that even if an offset value is obtained for the data that does not reach the certain number C1, the accuracy of the offset value can be considered to be low. It is noted that in the step S7 it may also be determined if a continuous stop time has reached a certain time.

In step S8, an error contained in the data of the gyro 43 that have been obtained by this time is actually evaluated. The reason is that, since sometimes the offset value itself drifts due to the change of environment such as a rise in the surrounding temperature of the device even during the stop of a vehicle if a long period of time elapses, it becomes necessary to update the previous offset value. If it is assumed that the output data of the gyro 43 have a standard deviation of $\sigma o$ (deg/s) and are C1 in number, an estimated error in an offset value $\epsilon$ obtained is given by the following equation (2):

$$\sigma o/\sqrt{C1} \tag{2}$$

That estimated error is reduced in proportion to $-\frac{1}{2}$ power of C1. If, on the other hand, it is assumed that the drift of the offset value increases in proportion to time, it is expressed by the following equation (3):

$$\epsilon o + m\, t \tag{3}$$

where m is a change rate of the drift (constant), and $\epsilon o$ is the preceding offset value. Therefore, after the time that both equations (2) and (3) cross each other, the accuracy of the offset value cannot be increased even if a large number of data are averaged. Hence, even during the stop of the vehicle, the offset value is updated at the time equations (2) and (3) cross each other. It is noted that sometimes the gyro output that drifts is expressed by the following equation (4):

$$\epsilon + m t + L \tag{4}$$

where L is a short fluctuation component. In that case, during the time that the vehicle is at a stop and even before equations (2) and (3) cross each other, it is meaningless to collect the gyro output data once the estimated offset value expressed by equation (2) becomes less than the short fluctuation component L of equation (4). The offset value is therefore updated at that time.

In order to update the offset value, in step S13 the averaged value ($\epsilon = S/C1$) of the offset outputs that are C1 in number is obtained. Then, the step S13 advances to step S14, wherein the averaged value $\epsilon$ is stored in the buffer memory 20. If the previous data remain in the buffer memory 20, they are deleted and the averaged value $\epsilon$ is newly stored. In step S15 the averaged value $\epsilon$ is read out of the buffer memory 20. The step S15 then advances to step S16, wherein the offset correction is made by subtracting the averaged value $\epsilon$ from the output data of the gyro 43 thereafter.

In step S17, the count C representative of the number of data stored is set to zero, and the FIFO memory and S are cleared.

Next, assume that it was determined that the vehicle starts moving, on the basis of the pulse output of the wheel sensor 41 and the output of the gyro 43.

If the movement of the vehicle is detected, the step S1 advances to the step S12, wherein an error contained in the data of the gyro 43 that have been obtained by this time is evaluated, as in the case of the step S8. If the error is small, the averaged value of the offset outputs is obtained in the step 13 and stored in the step 14. As previously described, the step 14 advances to the step S15. If the error is large, the offset correction is not made and the step S12 advances to the step S17.

As described above, whether the vehicle is at a stop or not is determined on the basis of the pulse output of the wheel sensor 41 and the output of the gyro 43, the offset value is calculated on the basis of the output data of the gyro 43 during the stop of the vehicle, and the offset correction can be made. In addition, if in that case the error contained in the output data of the gyro becomes less than an error caused by the drift of the offset value, an old averaged value is updated to a new averaged value and the offset correction is made with this updated averaged value. Therefore, even if the vehicle is at a stop for a long period of time, an adverse influence of the drift of the offset value itself can be prevented to the utmost.

Furthermore, the data of the terrestrial magnetism sensor 42 may be used together with the data of the gyro 43. The current location of a vehicle may be calculated from the heading data obtained and the distance data obtained from the output of the wheel sensor 41. In that case, a map matching method may be used in which the calculated current location of the vehicle is compared with road map data, an estimated heading of the vehicle is corrected by evaluating a degree of correlation with the road map data, and the current location of the vehicle is set on road (Japanese Patent Laid-open Publication No. 63-148115, Japanese Patent Laid-open Publication No. 64-53112, corresponding to U.S. Pat. Nos. 4,999,783 and 4,807,127, respectively). The current location of the vehicle obtained may also be used in land-based radio and/or satellite location systems. These methods are well known in the prior art, so a description will not be given.

As has been described hereinbefore, the present invention is constructed such that the period that the vehicle is at a stop is determined by the stop determining means on the basis of disappearance of the vehicle speed sensor output and a reduction in the turning angular velocity sensor output. For this reason, as compared with the case that the period of the stop of the vehicle is determined by only the vehicle speed sensor output or by only the turning angular velocity sensor, the actual stop of the vehicle can be determined more accurately. As a consequence, the margin for calculating the offset value can be made shorter, and in a case where the stop of the vehicle is a short period of time, the offset correction can be made by effectively using the short period of time. In addition, if the error in the output of the turning angular velocity sensor becomes less than an error caused by a drift of the offset value, the offset correction is made even during the period of the stop of the vehicle determined by the stop determining means. Accordingly, a new offset value can be obtained at all times and the offset correction can be made with the new offset value.

While the subjection invention has been described with relation to the preferred embodiment, various modifications and adaptations thereof will now be apparent to those skilled in the art. All such modifications and adaptations as fall within the scope of the appended claims are intended to be covered thereby.

What we claim is:

1. An offset correction apparatus comprising:
   a turning angular velocity sensor;
   a vehicle speed sensor means for outputting a pulsed signal every constant distance traveled by a vehicle;
   stop determining means for determining that said vehicle is at a stop;
   offset calculation means for integrating an output of said turning angular velocity sensor during a period of time that the stop of said vehicle is determined by said stop determining means and then calculating an offset value of said output of said turning angular velocity sensor;
   storage means to store said offset value calculated by said offset calculation means; and
   heading correction means for correcting heading data obtained from said output of said turning angular velocity sensor, with said offset value; wherein
   said stop determining means determines that said vehicle is at a stop in response to an absence of said pulsed signal from said vehicle speed sensor means in combination with said output from said turning angular velocity sensor being less than a threshold.

2. The offset correction apparatus as set forth in claim 1, wherein said offset calculation means evaluates an error in said output of the turning angular velocity sensor, and if the evaluated error in said output of the turning angular velocity sensor becomes less than an error caused by a drift of said offset value, said offset calculation means calculates an offset value of said output of said turning angular velocity sensor independently of said period of time that the stop of said vehicle is determined by said stop determining means.

* * * * *